(No Model.) 3 Sheets—Sheet 1.
C. HEISLER.
REGULATOR FOR DYNAMO ELECTRIC MACHINES.
No. 379,956. Patented Mar. 27, 1888.
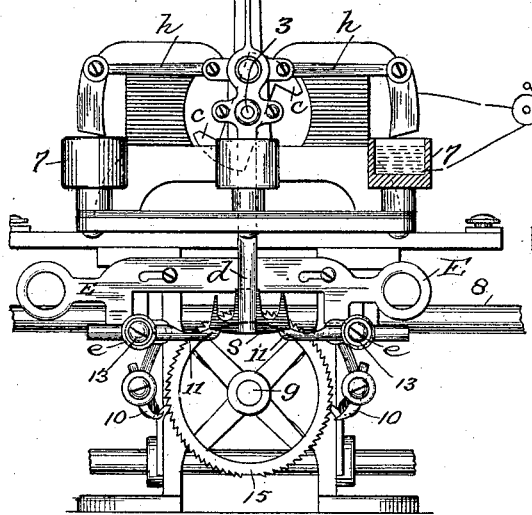
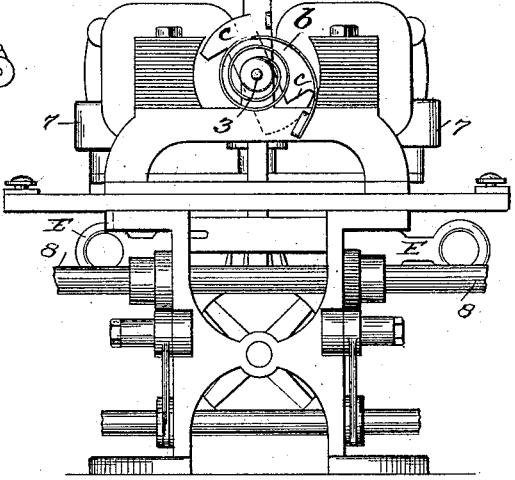
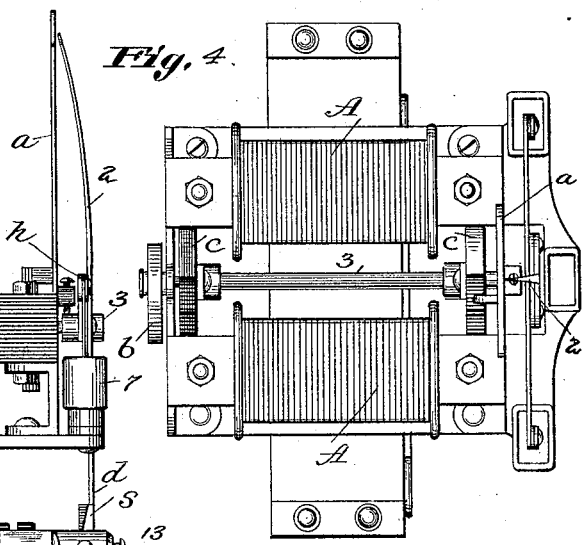
Attest:
F. L. Middleton.
C. L. Sturtevant.
Inventor:
Chas. Heisler.
by Ellis Spear
Atty.

(No Model.) 3 Sheets—Sheet 2.
C. HEISLER.
REGULATOR FOR DYNAMO ELECTRIC MACHINES.
No. 379,956. Patented Mar. 27, 1888.
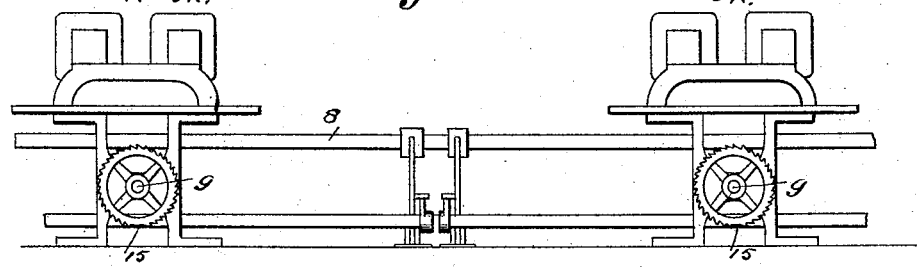
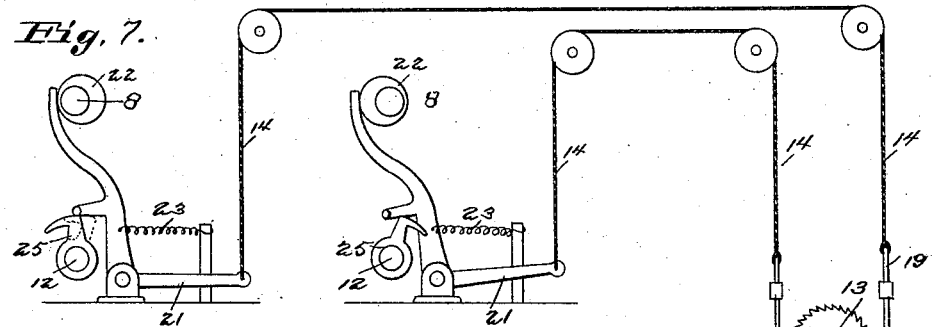
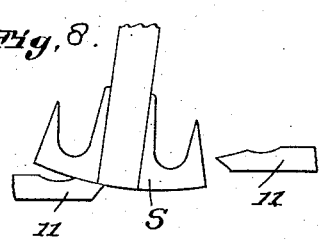
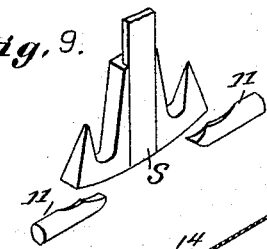
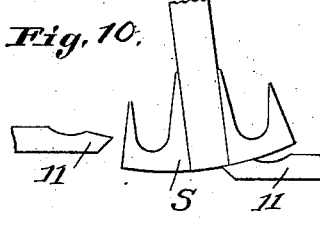
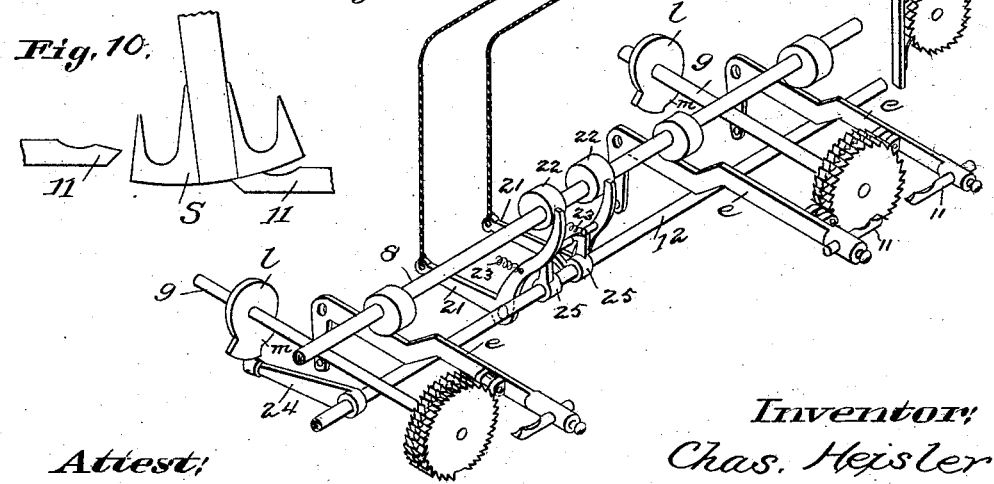
Attest:
F. L. Middleton
C. L. Sturtevant
Inventor:
Chas. Heisler
by Ellis Spear
Atty.

(No Model.) 3 Sheets—Sheet 3.

C. HEISLER.
REGULATOR FOR DYNAMO ELECTRIC MACHINES.

No. 379,956. Patented Mar. 27, 1888.

Attest:
F. L. Middleton
C. L. Sturtevant.

Inventor:
Chas. Heisler
by Ellis Spear
Atty.

UNITED STATES PATENT OFFICE.

CHARLES HEISLER, OF ST. LOUIS, MISSOURI.

REGULATOR FOR DYNAMO-ELECTRIC MACHINES.

SPECIFICATION forming part of Letters Patent No. 379,956, dated March 27, 1888.

Application filed February 10, 1887. Serial No. 227,159. (No model.)

*To all whom it may concern:*

Be it known that I, CHARLES HEISLER, of St. Louis, in the State of Missouri, have invented a new and useful Improvement in Meter and Regulator for Dynamo-Electric Machines; and I do hereby declare that the following is a full, clear, and exact description of the same.

My invention is an impróved meter and regulator for dynamo-electric machines. It is applicable, connected in the main line as an ampère-meter, to a single-current dynamo-machine or as a voltmeter in multiple-arc line, in both instances serving to indicate the amount of electro-motive force or current and to move the brushes into or out of the field. It may also be used with an alternating machine, when the current collected by the brushes, regulated or moved into or out of the field by this instrument, may be used to excite field-magnets for the production of alternating currents. In the latter instance the instrument will act either as a volt or ampère meter and be connected in series or parallel within the alternating-current circuit to shift the brushes for the accurate amount of alternating current.

I have hereinafter described in detail the construction and application of my invention to its various modes of use, referring to the accompanying drawings, in which—

Figure 12:
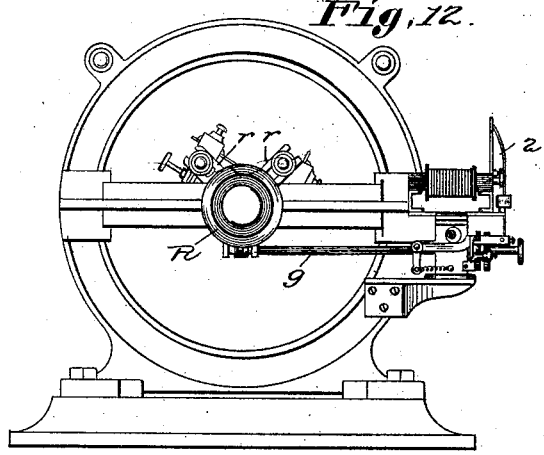
Figure 11:
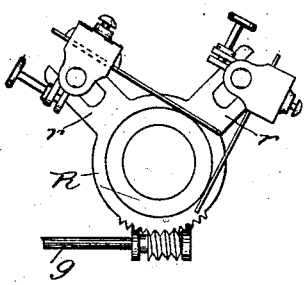
Figure 13:
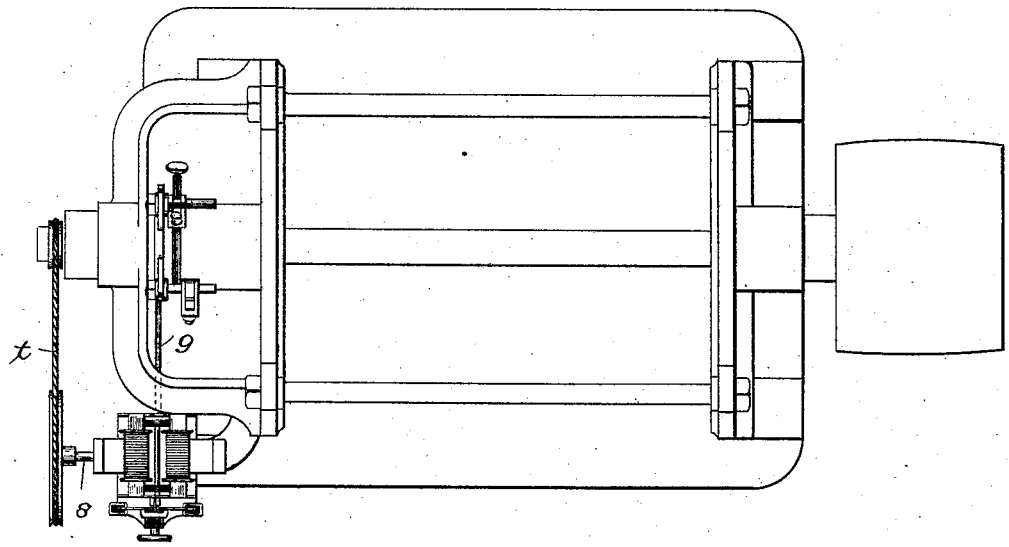
Figure 14:
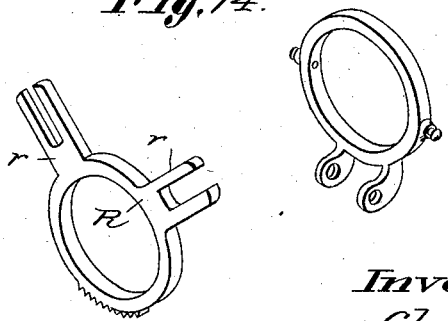

Figure 1 represents a front elevation of the machine. Fig. 2 is a rear elevation. Fig. 3 shows a side elevation of Fig. 1, looking from the left. Fig. 4 represents a top view of the machine. Fig. 5 represents a front elevation of two regulators. Fig. 6 is a perspective view of the same with part of their connections. Fig. 7 represents more clearly these connections in diagrammatic form. Figs. 8, 9, and 10 illustrate the various positions and operation of the shoe in respect to the arms of the operating-levers. Fig. 11 shows the brush-holders detached. Fig. 12 shows an end view of the dynamo and side elevation of the regulator, illustrating the connection between the two. Fig. 13 is a top or plan view of the same. Fig. 14 further illustrates the form of the brush-holders. Fig. 15 represents a cam of the main shaft in side elevation.

I will proceed first to describe the simple form of the regulator, in which the shaft is directly connected to the brush of the machine. This shaft (marked 3) is mounted in bearings in the frame of the instrument equidistant between and parallel with the cores A A of the electro-magnets. These cores I prefer to make of thin plates of tinned iron or ordinary sheet-iron, which plates extend beyond the spools to form the poles, as shown in Figs. 1, 2, 3, and 4. The coils of the magnets may be in the main line or in a shunt thereof, according to the requirements of the case. Fixed on the front end of the shaft is an index-finger, 2, the point of which passes in front of a graduated segment, $a$, supported on a standard on the frame of the instrument. To the same shaft is attached the inner end of a coiled spring, $d$, the outer end of which is fixed to the frame. This spring is properly adjusted to hold the index-finger to point over the zero-mark or some designated point on the scale when the normal amount of current is on the line. The shaft 3 also carries armatures $c\ c$, the outer ends of which are adapted to pass in front of the poles of the magnet as the shaft turns, and they are so arranged that the attraction poles act upon the armature against the tension of the spring and cause the shaft to turn and the index-finger to travel over the scale and to indicate the strength of the current or electro-motive force of the machine. The index-finger has a downward extension, $d$, the lower end of which is provided with a shoe, S, curved on its under side on an arc struck from the index-shaft as a center. In the frame of the instrument on each side is a bell-crank lever, $e$, pivoted at its angle. The short vertical arm thereof is drawn by a spring, $f$, forward, and tends thereby to raise the front end. Each lever on its front end carries a pawl, 10, which in the upward movement of the lever engages with a ratchet-wheel. The ratchet-wheels $g\ g'$ (one for each pawl) are fixed on the front end of the shaft 9. The pawls in their forward movement ride over the teeth and turn the wheels only in their upward movement and by the force of the springs, and one pawl operates to turn the shaft 9 in one direction and the other pawl in the other direction.

The levers $e$ are depressed by means of eccentrics on a shaft, 8, which is connected by some convenient mechanism with the shaft of the dynamo, and is thereby driven constantly.

It acts on the lever e only when the levers are up, and then the eccentrics operate to depress the levers for the engagement with the ratchet-wheels. From the end of each lever an arm, 11, extends inwardly in vertical plane with the shoe on the end of the extension d. The end of each arm is adapted to project under the shoe when said shoe is swung a certain distance toward such arms, and when over the arm it holds the lever e down out of operative reach of the eccentric on the shaft 8. The ends of the shoes are made with upturned faces, which bear against the ends of the arms when the extension is swung and the arm is not down, and, as shown, as the constantly-revolving shaft 8 has depressed the arm the shoe engages therewith. The shoe is long enough to bridge the distance between the inner ends of the arms, and thus may hold both levers out of work, and within certain limits of oscillation of the index-finger will thus hold both and prevent any rotation of the shaft 9. These limits are changeable by reason of the adjustability of the arms, which are held in the levers e by set-screws 13. When the index-finger swings beyond the assigned limit, the shoe is moved from one arm, and the lever on that side is allowed to rise and turn the shaft. This brings it into range with the eccentric, which again depresses it, and the action is continued until the extension of the index-finger returns the shoe to the position above indicated over the arm. The action is the same on both sides, except, as above explained, one lever turns the shaft one way and the other in the opposite direction. The shaft is connected, when the instrument is used with a single-current dynamo-machine, directly to the brushes, and as it turns one way or the other moves the brushes toward or away from the line of maximum force. The lever and pawl when released by the removal of the shoe continue to operate the wheel and move the brushes until the shoe returns and again obstructs the lever.

Over the levers e is a dog, E, which slides on screws passing through slots, and this may be used to hold the levers out of work.

Opposite the pivotal point of the index-finger are arms h, placed at right angles to the finger and extending over mercury-cups 7, into which pendent extensions dip when the index-finger moves to a designated point. This is designed to close a local alarm-circuit and give notice to the attendant.

The ratchet-wheels are mutilated at 15 to limit the movement of the shaft which operates the brushes and causes the power to cease to operate on the ratchet-wheels after it has moved either of them a certain prescribed limit, and this or some equivalent is necessary to the operation of the machine whether it be used to directly move the brush, as in the single line, or whether two or more be used, as in multiple lines.

In order to adapt this form of regulator to the double or multiple line from the same dynamo-machine further mechanism is required. This is illustrated on Sheet 2 of the drawings. On this sheet are shown, for example, two regulators designed for two independent lines for the same machine. In Fig. 5 of Sheet 2, M M represent regulators of the form heretofore referred to, shown on Sheet 1. In this the shaft 8 (shown more clearly in Fig. 6) operates on both instruments, being extended over both and carrying cams which are precisely of the same form and arrangement as those shown on Sheet 1. They act upon the levers e in the same way, and the levers e are controlled by the extension of the index-finger in each instrument and operate upon the shafts 9 of the ratchet-wheels; but in this case the shaft 9 is not connected to the brushes in either of the two instruments M M. Direct connection with the brushes is through a separate shaft, 13, which also has ratchet-wheels, as shown in Fig. 7. These ratchet-wheels are placed one opposite the other on the same shaft, the teeth of one being in reverse direction to those of the other, and they are operated directly by pawls 16 and 17, placed on bars 18 and 19. Reciprocating motion alternately is given to these bars through retracting-springs 20 and cords 14, which cords extend to bell-crank levers 21, pivoted at their angles and having their upward arms extended to bear against the faces of eccentrics 22 on the shaft 8. These upwardly-extending arms are drawn toward the eccentrics by springs 23. As the shaft 8 constantly rotates with only the instrument above described, the ratchet-wheel on the shaft 13 would be continuously and injuriously operated and would be altogether out of control of the instruments M M. To bring them into control of these instruments I have provided a shaft, 12, located beneath the shaft 8 and parallel thereto in suitable bearings. It is provided with arms 24, of which only one is shown in the drawings in Fig. 6. These arms extend underneath the cams 1 on the shafts 9 9, and are provided with anti-friction rollers on the end, which bear on the peripheries of these cams. The outline of these cams is shown more clearly in Fig. 15 of Sheet 1. On the shaft 12 are fixed dogs 25, which extend upward and have curved faces adapted to come in contact with pins set horizontally in the sides of the upwardly-extending arms of the bell-crank levers 21. The position of these dogs in relation to the pins of the levers is shown more clearly in Fig. 7. When the arm 24 is pressed down by the high part of the cam 1, the dog is thrown forward, as shown in full lines on the right of Fig. 7, and when the arm rides upon the low part of the cam the dog is thrown back in the position shown in full lines at the left of Fig. 7.

When the anti-friction wheel of the arm 24 is on the intermediate part of the cam 1, the dogs are in position shown in dotted lines on the left of Fig. 7. The dogs are not set exactly in line with each other and are in reverse position, as shown in Figs. 6 and 7. Fig. 7 illustrates the reverse position, the parts being represented in that figure as removed from the shaft for clearness of illustration. Action of both cams 1 1 is the same and the levers 24 are precisely alike in construction and arrangement and only one is shown. When by reason of an increase of current in one of the lines from the dynamo or other machine the index-finger is swayed and the levers *e* are allowed to work and act upon the shaft 9, its motion in one direction will cause the cam 1 to depress the lever 24, and when the high part of the cam is on the lever, depressing it to the extreme limit, it will turn the dogs 25 in the position shown in Fig. 6—that is to say, the left-hand dog will be underneath and in contact with the pin and the arm of the bell-crank lever which bears against the eccentric 22, and the frictional contact will hold this arm away from the eccentric, so that it will be out of action; but the right-hand dog will be in the position shown more clearly in the right hand of Fig. 7, in a position in front of the pin of the right-hand arm of the bell-crank lever not in contact with it, so that this right-hand arm will be in working-connection with its eccentric, and through its appropriate cord 14 will act upon the shaft 13 and move the brushes in one direction. The same effect will be produced whichever instrument M is in operation when its high part of the cam comes in contact with the arm 24; but when the arm 24 is in contact with the low part of the cam 1 the shaft 12 is turned by any suitable spring or weight, which keeps the antifriction roller on the end of the arm 24 always in contact with the periphery of the cam, and the dogs are thrown forward, so that the right-hand arm is held by the frictional contact of its pin with the dog out of operative connection with its eccentric and the other is allowed to operate, being released, so that the brushes are moved in an opposite direction. When the end of either arm 24 is on the intermediate part, *m*, of the cam 1, both dogs are held under the pins and both arms are held out of working-contact and the brushes remain stationary. By this construction of the apparatus each separate line has automatic regulation in its own circuit and all of the circuits harmoniously regulate the exciting-current, so as to produce the sufficient quantity to the line requiring the most current, and the several regulators together will set the brushes and regulate the field-magnet current for all the lines as may be required.

Brushes are held by movable arms as in the Thomson-Houston system, but are set on a single ring, as shown clearly in Fig. 11, the ring being marked R and the arms *r*. Part of the ring is provided with teeth on its external periphery engaging with an arm on the end of the shaft 9. These parts are shown in place at Fig. 12, and in Fig. 13 is illustrated also the connection between the main shaft of the dynamo and the constantly-revolving shaft 8 of the regulator. The said connection consists of a band or rope, *t*.

The action of the apparatus is essentially the same whether it serves to move the brush-holder directly or indirectly, and the regulator may be placed either in the ordinary circuit or in the circuit-resistance.

I claim as my invention—

1. In combination with the dynamo or current-generator, an electro-magnet, and an armature carrying an index-finger operated by the magnet, and means for moving the armature in opposition to the power of the magnet and a shoe carried on the extension of the index-finger, pawls controlled by this shoe, a constantly-operating shaft connected to and acting on the pawls, and a shaft operated by the pawls and connected with the brushes of the generator, whereby the said generator is regulated.

2. In combination with the shaft driven constantly by the motor, eccentrics on said shaft, and levers carrying pawls adapted to act alternately on ratchet-wheels on a shaft connected with the brushes, and a shoe acting on the extension of the index-finger acting to control the pawls, the ratchet-wheels and index-finger and their supporting-connections being also in the combination, whereby the said brushes are moved to regulate the current, substantially as described.

3. In combination with the shaft 8, carrying eccentrics, the levers *e e*, and springs for keeping them in contact with the eccentrics, pawls 10, the shaft 9, carrying ratchet-wheels, said shaft being connected to and combined with the brushes, arms 11 on the ends of the levers *e e*, and a device carried by and combined with the armature of the electro-magnet for controlling the said levers, substantially as described.

4. In combination with the levers *e e* and the shaft for operating the same, pawls carried upon said levers, a shaft connected to the brushes, mutilated ratchet-wheels on said shaft, and means operated by an electro-magnet for controlling the levers *e*, the brushes, the electro-magnet, and their supports and necessary connections being also in the combination, whereby the ratchet-wheel may be operated by the pawl to a limited movement extending in either direction to regulate the current, substantially as described.

5. A constantly-revolving shaft, a shaft connecting and combined with the brushes, and mechanism for intermittingly applying the force of the constantly-revolving shaft to the brushes, an index-plate and index-finger moved by an electro-magnet in the circuit, and a spring and shoe on an extension of the index-finger controlling the mechanism which moves the brushes, substantially as described.

6. In combination with a dynamo-machine working on two or more circuits, a regulator for each circuit, having a shaft common to each with gearing combined with and driving it constantly, and a shaft for moving each of the brush-holders and the common shaft by one of the regulators, whereby each line has automatic regulation and all the circuits have control of each line, substantially as described.

7. In combination with the regulators for each line, the cams 1 on the shaft 9 of each regulator, the shaft 12, having arms whereby it is moved by the cams 1, levers 21, acting with the mechanism to move the brushes, and dogs carried by the shaft acting to control the levers 21, substantially as described.

8. The combination, with the levers $e\ e$, of the regulator, and the dog E, adapted to slide from said levers, substantially as described.

9. In combination with the index-finger of the regulator, the arms $h$, having extensions, and mercury-cups arranged beneath the extensions adapted to close local alarm-circuits, substantially as described.

In testimony whereof I have signed my name to this specification in the presence of two subscribing witnesses.

CHAS. HEISLER.

Witnesses:
PAUL F. COSTE,
W. B. HOMER.